(No Model.)　　　　　W. H. KITSON.　　　2 Sheets—Sheet 1.
RAILWAY WHEEL.

No. 375,879.　　　　　　　Patented Jan. 3, 1888.

Witnesses.　　　　　　　　　Inventor.
Edward Hinde.　　　　　　　William Henry Kitson
Lawrence Dean (No Model.) 2 Sheets—Sheet 2.

W. H. KITSON.
RAILWAY WHEEL.

No. 375,879. Patented Jan. 3, 1888.

Witnesses.
Edward Hinde
Lawrence Dean

Inventor.
William Henry Kitson.

United States Patent Office.

WILLIAM HENRY KITSON, OF KIRKSTALL, NEAR LEEDS, COUNTY OF YORK, ENGLAND.

RAILWAY-WHEEL.

SPECIFICATION forming part of Letters Patent No. 375,879, dated January 3, 1888.

Application filed April 26, 1887. Serial No. 236,245. (No model.) Patented in England December 10, 1885, No. 15,169.

*To all whom it may concern:*

Be it known that I, WILLIAM HENRY KITSON, a subject of the Queen of Great Britain and Ireland, residing at Kirkstall, near Leeds, in the county of York, Kingdom of Great Britain and Ireland, have invented Improvements in Railway and Tramway Wheels, (for which I have obtained a patent in Great Britain, No. 15,169, bearing date December 10, 1885,) of which the following is a specification.

This invention has reference to a construction of elastic compound wheel suitable for use on railways and tramways. The wheel body or center is of metal—such as iron or steel—and has formed in its periphery recesses or a recess into which blocks of material—such as wood—to form cushions are forced, so as to project somewhat beyond the periphery of the wheel body or center, and to take a firm bearing against the inner circumference of the tire, which is secured to the body or center by any suitable means—such as a flanged ring or rings—that will alone, or with the aid of a part of the tire, prevent lateral displacement of the cushioning-blocks.

Figure 1:
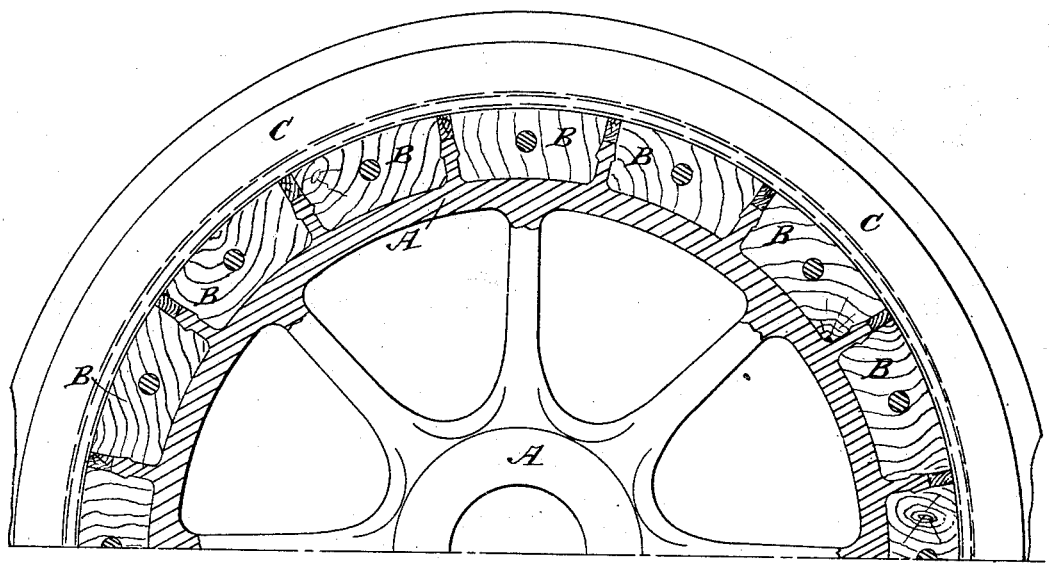
Figure 3:
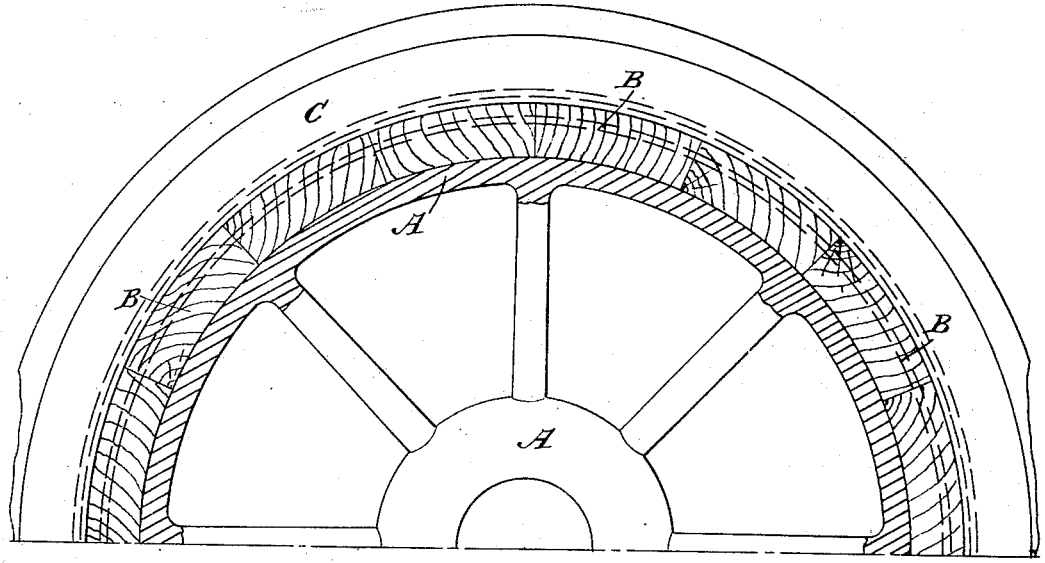
Figure 1:
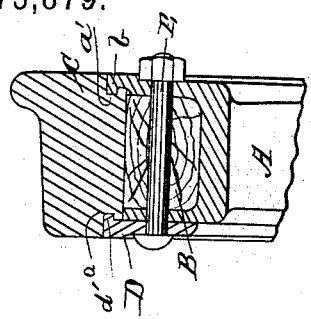
Figure 10:
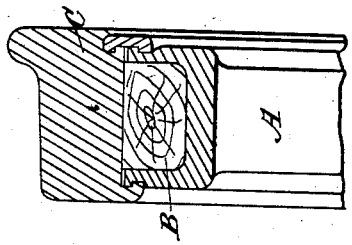
Figure 2:
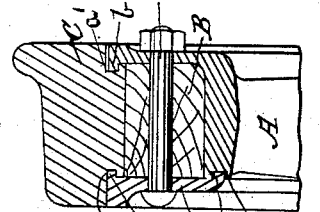
Figure 4:
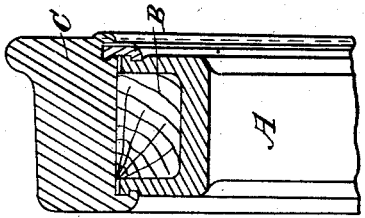

In the accompanying drawings, Figure 1 is a sectional view of half a wheel according to my invention, showing the cushioning-blocks forced into a series of recesses in the periphery of the wheel. Fig. 2 is a cross-section of my preferred construction, showing the rim, the tire, a cushioning-block, and a fastening-ring. Fig. 3 is a sectional view of half a wheel according to the construction shown in Fig. 2, the periphery of the wheel being provided with a continuous groove or channel, into which the cushioning-blocks are forced in sections; and Figs. 4, 5, 6, 7, 8, 9, and 10 are cross-sections of modifications, showing different modes of securing the tire to the body or center portion of the wheel.

The metallic wheel body or center A has formed in its periphery a continuous channel or groove extending entirely around said periphery, and into which cushioning-blocks B, of suitable material—such as wood, &c.—are forced, so as when in place to project somewhat beyond the periphery of the body portion A, and to take a firm bearing against the inner circumference of the tire C, which is adapted to be secured to the body or center in a suitable manner, as will hereinafter appear.

In my preferred construction for securing the tire to the body or center portion of the wheel the inner edges of the tire are provided with grooves $a$ $a'$, and the body or center portion with a groove, $b'$, upon one edge, and with a flange, $b$, upon the opposite edge, which is adapted to enter the groove $a'$ in the tire when the parts are united. For securing the opposite edges of the body portion and tire together I provide an annular fastening ring or rings, D, which are provided with a flange, $d'$, adapted to enter the groove $a$ in the tire, and with a flange, $d$, adapted to enter the groove $b'$ in the body portion of the wheel when the parts are united.

The several parts of the wheel when assembled are held rigidly in position by means of the retaining-bolts E, which pass through the flanged fastening ring or rings, the cushioning-blocks, and the body portion of the wheel, as clearly shown in Fig. 2.

Figure 6:
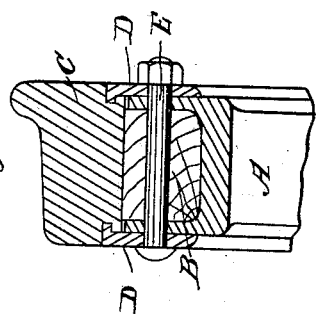
Figure 9:
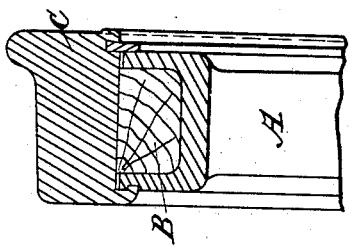
Figure 5:
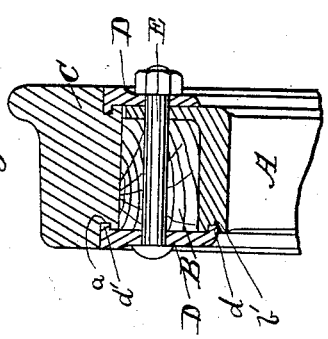
Figure 8:
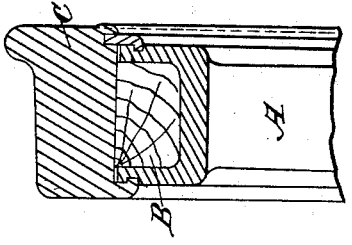

Although I prefer to use but one fastening-ring in my device, I do not wish to limit myself to that construction, as it is evident that one or more fastening-rings can be equally well employed by simply dispensing with the flange upon the body portion and substituting another flanged ring, as shown in Figs. 5 and 6.

I especially reserve the right to file applications later on for the several forms of construction shown but not claimed in this application.

Having thus fully described my invention, what I claim as new, and desire to secure by Letters Patent, is—

1. In a car-wheel, the combination of a body or center portion having a continuous annular groove or channel in its periphery, a tire, cushioning-blocks adapted to be forced into said continuous groove or channel, so that when in position they will project beyond the periphery of the body portion and bear against the inner circumference of the tire, and retaining-bolts passing through said cushioning-blocks and the body portion of the wheel, whereby the tire, cushioning-blocks, and body portion are locked together, substantially as described.

2. In a car-wheel, the combination of a body portion, a tire, cushioning-blocks located in the periphery of the body portion of the wheel, so as to project beyond said periphery and bear against the inner circumference of the tire, a flanged annular fastening ring or rings adapted to engage the body portion and tire, and retaining-bolts, whereby the flanged annular fastening ring or rings and the tire are locked in position and to the body portion of the wheel, substantially as described.

In testimony whereof I have signed my name to this specification in the presence of two subscribing witnesses.

WILLIAM HENRY KITSON.

Witnesses:
EDWARD HINDE,
LAWRENCE DEAN,
    *Both of 1 Bond St., Leeds.*